UNITED STATES PATENT OFFICE.

WILHELM MAJERT, OF GRUNAU, GERMANY.

PROCESS OF MAKING AMMONIACAL CASEIN.

SPECIFICATION forming part of Letters Patent No. 586,854, dated July 20, 1897.

Application filed February 17, 1896. Serial No. 579,616. (No specimens.)

*To all whom it may concern:*

Be it known that I, WILHELM MAJERT, residing at Grunau, near Berlin, in the Kingdom of Prussia and German Empire, have invented a new and useful Improvement in the Process for the Production of Ammonia Salt of Casein, of which the following is a full, clear, and exact description.

My invention relates to an improved method of manufacturing the ammonia salt of casein.

The salts of casein have in later years reached an important position in the industries. I have found it possible to produce the ammonia salt directly in solid form, either by leading ammonia-gas over finely-powdered dry casein or into fluids which neither dissolve the free casein nor its ammonia salt and in which the casein is kept in suspension. The ammonia-gas is introduced as long as it is absorbed by the casein. Fluids for this purpose are alcohol, ether, ligroin, or benzol. After the casein-ammonia is formed the fluid is filtered off and the product dried by evaporation. The absorption of ammonia is produced by heating. The casein-ammonia thus produced is a white powder, stable in the air, soluble in water, forming a more or less clear solution, depending upon the purity of the casein used. This solution is altogether without taste.

I claim—

1. The process of direct manufacture of the ammonia salt of casein in solid form, which consists in bringing ammonia-gas into contact with finely-powdered dry casein, substantially as described.

2. A new compound in dry, solid form and easily soluble in water, consisting of casein in its combination with ammonia.

In witness whereof I have hereunto set my hand in presence of two witnesses.

WILHELM MAJERT.

Witnesses:
PEREGRINE VARNALS,
W. HAUPT.